Dec. 28, 1965 J. H. LEMOINE 3,226,695

BINARY CODED INFORMATION STORE

Filed Aug. 7, 1961 2 Sheets-Sheet 1

INVENTOR:
Jean Henri Lemoine

By
Kemon, Palmer, Stewart
& Estabrook

INVENTOR

Jean Henri Lemoine

By:

Kemon, Palmer, Stewart & Estabrook

United States Patent Office 3,226,695
Patented Dec. 28, 1965

3,226,695
BINARY CODED INFORMATION STORE

Jean Henri Lemoine, Rueil-Malmaison, France, assignor to Societe d'Electronique et d'Automatisme, Courbevoie, France Filed Aug. 7, 1961, Ser. No. 129,698
Claims priority, application France, Sept. 28, 1960, 839,937, Patent 1,275,507
2 Claims. (Cl. 340—173)

The present invention concerns improvements in or relating to binary coded information stores wherein each binary bit is permanently recorded on an elementary storing member and wherein said members are assembled in rows and columns for selective read-out of the required information by selective activation of rows and columns in the said matrix-like arrangement. Such permanently recorded stores may be of advantage in computing, data processing and/or switching systems wherein they may play the parts of instruction-word or number-word stores, function table stores, numeration and code converter stores, and the like, i.e. any stores which may be often read out for the operation of the system and do not necessitate any change of content thereof (except by replacement of the complete matrix arrangement or predetermined complete parts thereof.

It more particularly relates to such kinds of stores which comprise elementary condensers as storage members and has for its object to provide a very simple and efficient structure embodying condenser stores.

According to a feature of the invention, a binary coded information store of the above-specified kind comprises two conductive coatings on the opposite faces of a thin dielectric plate, each coating being shaped as an electrode array. The electrodes are arranged in rows and there are as many conductive lines as rows between said rows of condenser electrodes, the electrodes on both faces registering from one face to the other one of the dielectric plate and the conductive lines being orthogonal from one face to the other one of said plate, said conducting lines being connected by metallized parts to the electrodes with which they cooperate and said parts being cut-off on one face at the digital places wherein the binary digits zero must be recorded.

According to a further feature of the invention said cutoffs are made by perforating both the metallic coatings and the dielectric between said coating.

According to a further feature of the invention, said patterned coatings are made by printed-circuit techniques on said dielectric plate.

These and further features will be described in detail with reference to the accompanying drawings, wherein.

Of course, the drawings only consider an illustrative embodiment, wherefrom any technological variation within the scope of the invention may be easily deduced, such for instance as variation in the number of elementary recording condensers and shapes thereof and so forth.

Figure 1:
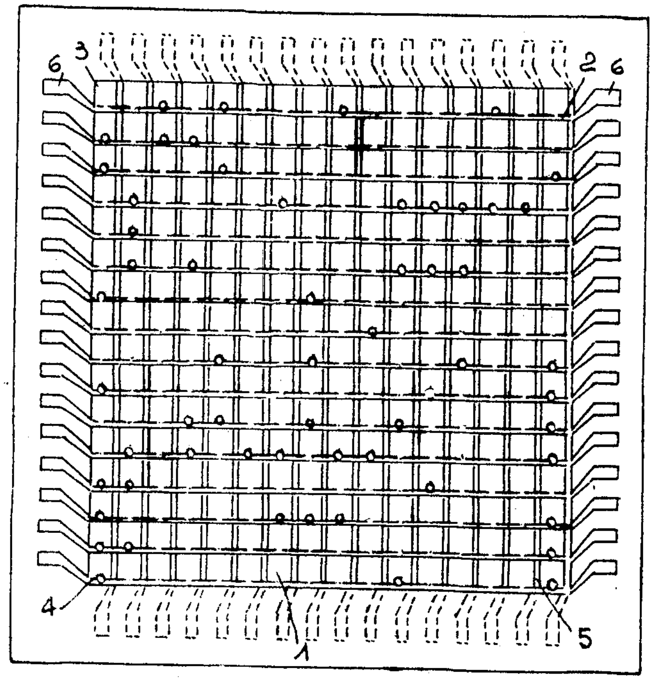
FIG. 1 shows a front view of a matrix member of a store according to the invention.
Figure 2:
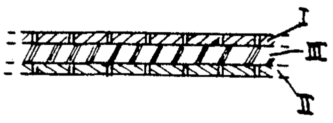
FIG. 2 shows a partial cross-section of FIG. 1.
Figure 3:
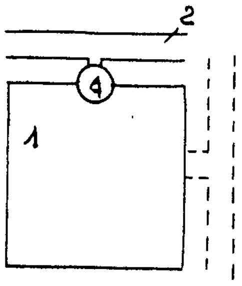
FIG. 3 shows an enlarged portion of the member of FIG. 1 to illustrate the recording of a digital value 0 in said store.

Referring to FIGS. 1 to 3, the matrix member store is made of the electrode networks, I and II, FIG. 2, intimately applied over the opposite faces of an intermediate dielectric plate III. Each row of electrodes 1, FIG. 1, is associated with a conductive line 2 in that the said electrodes are connected to said conductive lines at such places as 3, except when perforations such as 4 have been made for separating them from the conductive line at places whereat digital values of 0 must be recorded in the store, the other condensers recording the digital value 1. The electrodes are separated by naked insulating spaces such as 5 of substantially the same width as the conductive lines 2. Actually, the conductive pattern of each face may be obtained, neglecting the perforations 4, by a printed-circuit technique. For instance, the dielectric plate III may be metallized on both faces, photosensitized over the metallization coatings, the pattern may be photographed thereon, and thereafter, the conductive parts which are not protected by the photoresist may be etched off. Enlarged end portions such as 6 may be provided in the pattern at both ends of each conductive line 2 for later serving as terminals. The rear face presents the same pattern as the front face but with a relative rotation of 90°, which is shown in FIG. 1 by the dot lines showing the end terminals of the "column" conductive lines on said rear face. Instead of a two-face printed member, separate members may be provided with the print on one face only, all patterns being identical, and two of such members may thereafter be glued together with said relative 90° shift of direction in the conductive lines from one face to the other one of the complete thus assembled member.

It is advantageous to print the matrix members complete with all metallized connections between the lines and the condenser electrodes, without any provision for recording of the 0's, as this enables a suitable mass production of such members. Thereafter, for any special use, the information pattern is set on each member by punching out such holes as 4 for recording the 0 digits. The position of a hole with respect to the conductive line and the concerned electrode is clearly visible on FIG. 3. Each hole cancels a capacitive coupling between a conductive line on the front face and a conductive line on the rear face. For the sake of clarity, any conductive line on the rear face will be named a "column" and any conductive line on the front face, a "line."

Figure 4:
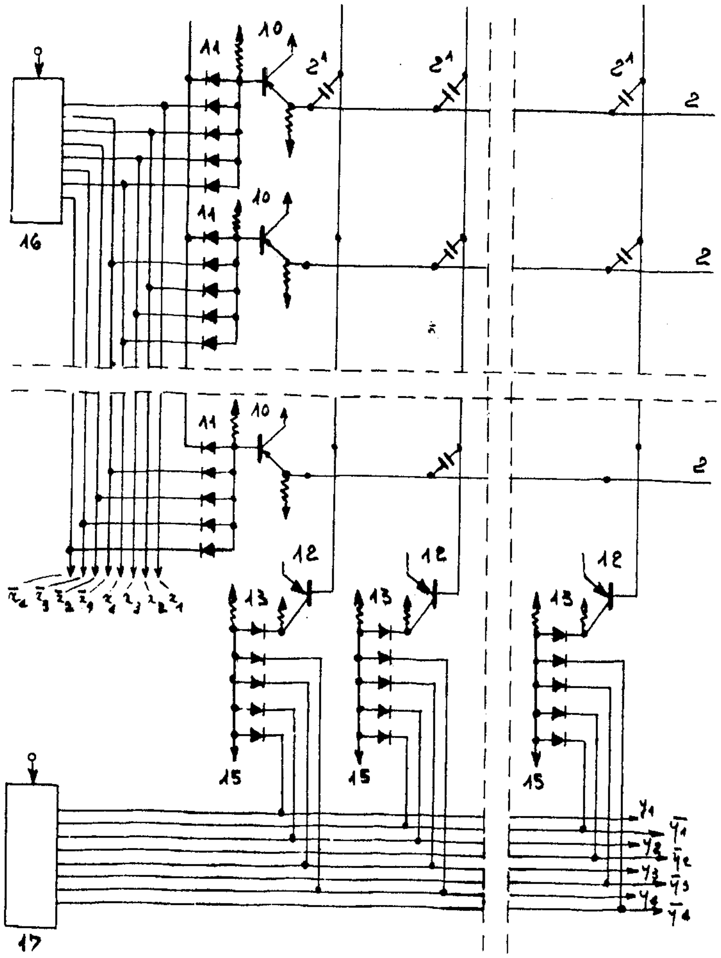
FIG. 4 shows an illustrative electrical arrangement, in a partial diagram, of the selection controls for a storage member of the type shown in FIG. 1.

When an alternating current is applied to such a line on the front face, said current will be translated to each column on the rear face connected to said activated line through a conductive coupling. For selecting a complete "word" to be read-out of a store, such an arrangement suffices which comprises means for selectively activating a single line on the front face, and separate pick-up circuits connected to the columns on the rear face. When required, selective activation circuits will be associated with the columns so that a read-out may be made which only read a single digital bit in the store. FIG. 4 shows an illustrative example of embodiment of a selection control arrangement in such a case. The circuit shown makes use of diode gates and amplifier transistors, but of course either kinds of gates and amplifiers, for instance with conventional vacuum tubes may be used.

In FIG. 4 only the two first and the last lines of FIG. 1 are shown and also the two first and the last columns are shown. Each line is connected to the output of a transistor amplifier 10 the base of which is connected to the output of a diode gate 11. Each column is connected to the input of a transistor amplifier-detector stage followed by a diode gate 13. All said gates are "AND-gates," and each comprises four inputs in addition to the A.C. input thereof. To the A.C. input of each gate 11 is applied an A.C. potential from the common lead 14. Each gate 13 is connected to an output lead 15. The four inputs of each gate 11 are connected to a distinctive combination of outputs of a four-digit register 16. The four inputs of each gate 13 are connected to a distinctive combination of a four-digit register 17. Four digits suffice for the selection between the sixteen digit values stored provided the registers 16 and 17 deliver each digit in both its direct and complementary forms: for the register 16, the digits $x_1$–$\bar{x}_1$, $x_2$–$\bar{x}_2$, $x_3$–$\bar{x}_3$ and $x_4$–$\bar{x}_4$; for the register 17, the digits $y_1$–$\bar{y}_1$, $y_2$–$\bar{y}_2$, $y_3$–$\bar{y}_3$, and $y_4$–$\bar{y}_4$. The outputs from 16 are distributed to the inputs of the gates 11 and the outputs of the register 17 are distributed to the inputs of the gates 13 in such relationship that for each binary code in 16, from 0 to 15, only one of the gates 11 is activated, and for each binary code in 17, also from 0 to 15, only one of the gates 13 is activated. The operation is quite plain: the setting of a binary code in 16 activates one of the lines 2 which receives the A.C. read-out signal from lead 14. Each column 2[1] capacitatively coupled to said line 2 consequently receives said A.C. signal translated through the corresponding condenser. The columns which are decoupled from line 2 by the holes 4 are not activated. But, from the code set in the register 17, only one gate 13 is activated and consequently only one column is selected for the issuance on the lead 15 of a signal corresponding to the digital value of the elementary storing member at the crossing of the line 2 and the column 2[1] which have been thus activated for the selective read-out.

The detailed operation of the diode gates and the transistor amplifiers and detector-amplifiers is not needed as being well known per se.

What is claimed is:

1. A permanent store for binary coded information comprising:

a dielectric plate;

a conductive matrix arranged on one face of said plate including a plurality of condenser electrodes arranged in a plurality of mutually perpendicular rows and columns, the condenser electrodes in each row being spaced apart from the condenser electrodes in adjacent rows;

a conductive line arranged between each pair of adjacent rows, and having branch connections to the condenser electrodes in one of said rows, but being insulated from the electrodes in the other adjacent row;

a second conductive matrix formed of a plurality of condenser electrodes carried on the opposite face of said dielectric plate, the electrodes in said second matrix being arranged in a plurality of rows extending at right angles to the rows in the first matrix, each row in the second matrix being spaced apart from the adjacent row, the second matrix having a conductive line located in the space between adjacent rows and having branch connections to the condenser electrodes in one row, but being insulated from the condenser electrodes in the row immediately adjacent the conductive line, said condenser electrodes, conductive lines, and branch connections in each matrix being arranged in the same plane, and said branch connections in each matrix being positioned so that each connection may be interrupted by a perforation passing through said plate without, however, destroying the electrical continuity of the line.

2. The combination defined by claim 1 and further including a source of alternating current oscillations having a plurality of routing circuits equal in number to the number of conductive lines on one surface of said dielectric plate; means connecting said routing circuits to said conductive lines on said one surface of said dielectric plate; and means connected to said conductive lines on the other surface of said dielectric plate for reading out signals from said store.

References Cited by the Examiner

UNITED STATES PATENTS

| | | | |
|---|---|---|---|
| 3,003,143 | 10/1961 | Beurrier | 340—173 |
| 3,011,156 | 11/1961 | MacPherson | 340—173 |

IRVING L. SRAGOW, *Primary Examiner.*